United States Patent
Swars

[11] Patent Number: 5,081,880
[45] Date of Patent: Jan. 21, 1992

[54] DRIVESHAFT WITH DRIVING ELEMENTS ATTACHED TO IT IN GROUPS

[75] Inventor: Helmut Swars, Bergisch, Fed. Rep. of Germany

[73] Assignee: Emitec Gesellschaft für Emissionstechnologie mgH, Lohmar, Fed. Rep. of Germany

[21] Appl. No.: 664,467

[22] Filed: Mar. 1, 1991

Related U.S. Application Data

[63] Continuation of Ser. No. 252,731, Oct. 3, 1988, abandoned.

[30] Foreign Application Priority Data

Oct. 2, 1987 [DE] Fed. Rep. of Germany ....... 8713285

[51] Int. Cl.⁵ ............... F16D 1/06; F16H 53/02
[52] U.S. Cl. .................... 74/567; 29/523; 123/90.6
[58] Field of Search ............. 29/523; 74/567; 123/90.6; 403/277, 359, 375

[56] References Cited

U.S. PATENT DOCUMENTS

| | | | |
|---|---|---|---|
| 3,869,938 | 3/1975 | Schlotterbeck et al. | 74/567 |
| 4,293,995 | 10/1981 | Jordan | 29/523 |
| 4,382,390 | 5/1983 | Jordan | 74/567 |
| 4,595,556 | 6/1986 | Umeha et al. | 74/567 X |
| 4,616,389 | 10/1986 | Slee | 74/567 X |
| 4,660,269 | 4/1987 | Suzuki | 74/567 X |
| 4,708,029 | 11/1987 | Urano | 123/90.6 |
| 4,750,250 | 6/1988 | Maus et al. | 29/523 |
| 4,761,870 | 8/1988 | Urano | 29/523 |
| 4,763,503 | 8/1988 | Hughes et al. | 74/567 X |
| 4,763,614 | 8/1988 | Burgio di Chagona | 123/90.6 |
| 4,783,898 | 11/1988 | Kanamaru et al. | 74/567 X |
| 4,798,178 | 1/1989 | Greulich et al. | 123/90.6 |
| 4,881,680 | 11/1989 | Toelke et al. | 74/567 X |

FOREIGN PATENT DOCUMENTS 0213529 3/1987 European Pat. Off. .
3717534 12/1988 Fed. Rep. of Germany .

Primary Examiner—Dwight Diehl
Assistant Examiner—Scott J. Anchell
Attorney, Agent, or Firm—Toren, McGeady & Associates

[57] ABSTRACT

The force-locking connection between a shaft (1) and driving elements (21) attached to it is improved or achieved via a slight plastic expansion of the shaft in that the driving elements are arranged in groups and connected by connecting sleeves (22) produced so as to be integral with the driving elements. The higher degree of elastic expansion is limited to the region of the connecting sleeves so that the driving elements themselves are largely excluded from this process. The dimensional accuracy of the finish-machined driving elements is not adversely affected. If necessary, recesses (27) may be produced to form webs (24) as a result of which the elastic deformation occurring in the inner region (23) is reduced.

6 Claims, 1 Drawing Sheet

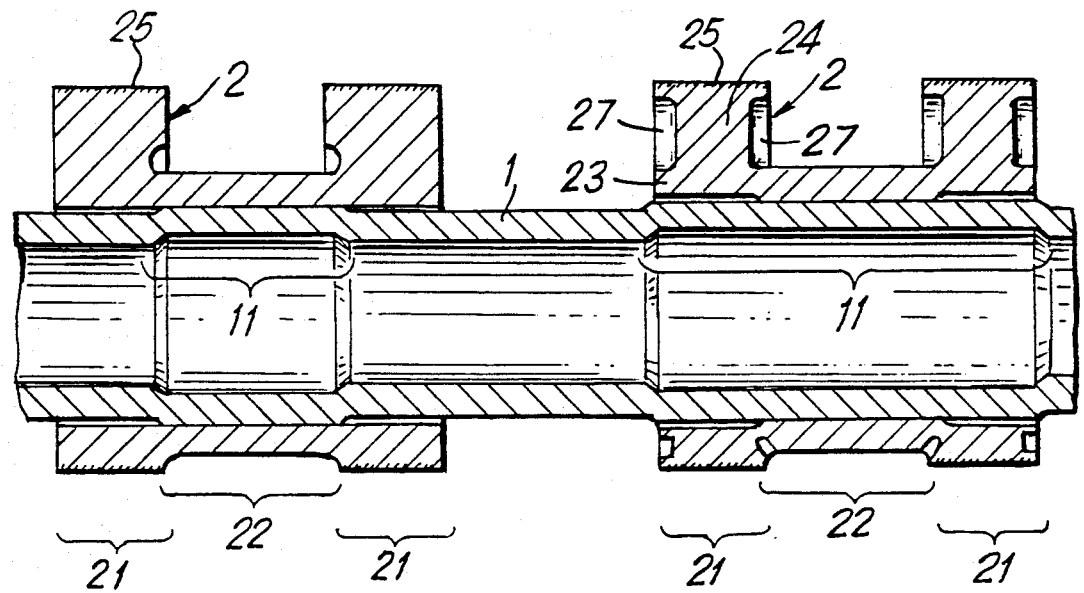

DRIVESHAFT WITH DRIVING ELEMENTS ATTACHED TO IT IN GROUPS

This is a continuation of application Ser. No. 07/252,731, filed Oct. 3, 1988, abandoned.

BACKGROUND OF THE INVENTION

The invention relates to a driveshaft. The driving elements referred to are meant to be those elements which are suitable for cooperating with other machinery parts such as gears, cams, but also parts of friction and roller bearings. Below, the invention will be described in connection with a camshaft intended to be incorporated in an internal combustion engine, but it is not limited to this application. In its EP-A-0 213 529, one of the applicants has proposed a process for attaching driving elements to a hollow shaft in the case of which the latter consists of commercial tube material, with the elements being slid on and subsequently fixed to it by expanding the tube portions underneath. The material of the tube itself is plastically deformed whereas that of the cam is only elastically deformed, with the spring-back of the latter causing the pressure resulting in the force-locking connection between the two parts. To enable the connection to withstand the loads occurring in operation, the product of the pressure force and the pressurised face must achieve a certain value. If, as has been the case so far, the width of the cam as well as the outer diameter of the hollow shaft are not increased beyond the dimensions applied for other design reasons, a relatively high expansion pressure (in the region of 2500 bars) is required for the shaft to undergo the necessary plastic deformation and the cam the necessary elastic deformation. This deformation is not limited to an inner region adjoining the shaft, but extends across the entire cross-section of the cam, and because the cam is not rotation-symmetrical, the extent of the deformation is azimuthally variable. It has been found that in consequence, one of the advantages aimed at with the above-mentioned process has been lost, i.e. to dimensionally finish-machine the cam prior to assembly and, possibly, specifically influence the material structure (for instance by surface hardening). Since expansion of cams hardened in such way may cause surface cracks, the applicants, in their German application P 37 17 534.3 which does not form part of the prior art, proposed to divide the driving elements into axially separate regions whose materials have different properties and especially different expanding coefficients.

SUMMARY OF THE INVENTION

It is the object of the present invention to provide a drive-shaft having driving elements attached to it in a force-locking way in the case of which the degree of elastic expansion is so slight that it does not extend as far as their boundary regions, thereby not putting the dimensional accuracy of the finish-machined driving elements at risk. Furthermore, the object is to reduce the necessary expansion pressure to approximately half the value given above, a measure which increases the service life of the seals which, on the probe used for expanding purposes, limits the regions to be expanded below the driving elements.

If, as proposed, the driving elements are at least partially connected to each other by thin-walled sleeves (which in consequence have a greater expansion ability), e.g. in the form of double cams such as they have recently been used for multi-valve internal combustion engines, on the one hand, the area available for producing the force-locking connection is increased, as a result of which the degree of elastic deformation may be reduced, and because the sleeves are more easily expandable due to their walls being thinner, the expansion pressure itself may be reduced. The elastic deformation in the driving elements may be limited to a radially inner region. It is also possible to combine driving elements of different kinds into groups, such a cams and bearing bushes, or the connecting sleeves themselves, by selecting a suitable type of material and surface condition, may be used for the latter purpose.

In a further embodiment of the invention, the driving elements combined in a group and the associated connecting sleeves have been produced in one single part; axially different material properties are possible but not necessary.

In accordance with an alternative embodiment, the driving elements may be fixed on the one hand through internal expansion of the shaft which is hollow for this purpose or, on the other hand, by the equivalent process of shrinking on. As with the latter process, in view of the stability of the material structure, the driving elements cannot be heated to any temperature, the area pressures achieved in the course of the subsequent cooling process are relatively low, so that an increase in the pressurised area is particularly significant.

Especially for driving elements which, like cams, do not have a rotation-symmetrical cross-section, it is proposed to assist the reduction in elastic deformation between the inner face and the outer face of the element by reducing the material thickness of the latter along a certain region looking at its longitudinal section so that the outside of the element is no longer subject to any resulting deformation.

It is proposed to limit the force-locking effect to the region between the sleeves and the shaft, but to increase slightly the inner diameter of the driving elements so that the expansion of the shaft only leads to the gap between the two parts to be closed without noticeably expanding the element.

The requirements in respect of the expanding ability of the material of the driving elements may be kept relatively low so that these may be produced from malleable cast iron for example, a material which has other advantageous properties which make it particularly suitable for this application.

BRIEF DESCRIPTION OF THE DRAWING

The FIGURE is a sectional view of a driveshaft according to the present invention.

DETAILED DESCRIPTION OF THE PREFERRED EMBODIMENT

Embodiments of the invention are illustrated in the drawing in the form of axial longitudinal sections. Double cams 2 have been slid on to the hollow shaft 1, with each double cam 2 consisting of two portions 21 forming the actual cam and a sleeve 22 connecting them. A hydraulic pressure probe which is not illustrated here but which is known to the person skilled in the art, is used to expand regions 11 of the hollow shaft which are plastically deformed in the process. The deformation is passed on to the connecting sleeves 22, but only within the elastic range; their spring-back achieved the force-locking connection connecting the shaft and the driving elements. The expanded range 11 is limited (lefthand half of the Figure) to that part of the hollow shaft 1 positioned opposite the connecting sleeve 22 so that the cam portions 21 are not or only slightly affected by elastic deformation. The gap remaining between the hollow shaft 1 and the cams has been given exaggeratedly large dimensions in the Figure. In a further embodiment (righthand half of the Figure), the expanded region 11 extends over the entire double cam 2. In order to prevent the deformation of the cam 21 from extending over an unacceptably long distance, especially as far as its surface 25, either the cams 21 may have a slightly larger internal diameter than the connecting sleeves 22 from the start so that in this case, too, elastic deformation is practically passed on to the latter only, or it is possible to provide recesses 27 as a result of which webs 24 are formed between a radially inner region 23 which is also elastically expanded and the outer region 25, with the elastic deformation being eliminated completely in the webs 24.

I claim:

1. A driveshaft, comprising:
   a tube (1) having a length equal to that of the driveshaft;
   a plurality of driving elements (21) attached to said tube; and
   a thin-wall sleeve (22) connecting at least two of the plurality of driving elements (21) to each other, said at least two driving elements (21) being integral with the connecting sleeve (22), a connection between said tube (1) and said driving elements (21) being established by a friction locking connection between said tube (1) and said connecting sleeve (22) only in axial portions of said connecting sleeve (22) between said at least two driving elements (21).

2. A driveshaft according to claim 1, wherein said tube (1) is plastically expanded only in axial portions inside of said connecting sleeve (22).

3. A driveshaft according to claim 1, wherein said driving elements (21) have an inner face with a diameter larger than that of the connecting sleeve (22), said inner face and said connecting sleeve each immediately facing said tube.

4. A driveshaft according to claim 3, wherein the tube (1) is plastically expanded only in axial portions (11) corresponding to the connecting sleeve (22) and said at least two driving elements connected together by the connecting sleeve, to form the friction locking connection.

5. A driveshaft according to claim 3, wherein the connecting sleeve is shrunk onto the tube (1).

6. A driveshaft according to claim 1, wherein said driving elements (21) are provided with axial recesses (27) so as to form webs (24) with a reduced cross-section, between a radial inner region (23) of the driving elements (21) which extends concentrically relative to the tube (1), and a radially outer region (25) of essentially uniform thickness.

* * * * *

UNITED STATES PATENT AND TRADEMARK OFFICE
CERTIFICATE OF CORRECTION

PATENT NO. : 5,081,880

DATED : January 21, 1992

INVENTOR(S) : Helmut Swars

It is certified that error appears in the above-identified patent and that said Letters Patent is hereby corrected as shown below:

On the Title page, item [73] the assignee should read as follow:
Emitec Gesellschaft fur Emissionstechnologie mbH, Lohmar, Federal Republic of Germany Signed and Sealed this Twenty-fifth Day of May, 1993

Attest:

MICHAEL K. KIRK

*Attesting Officer*  *Acting Commissioner of Patents and Trademarks*